June 19, 1962 J. ROSÁN 3,039,641
VALVE-TYPE INSERT
Filed Nov. 16, 1959
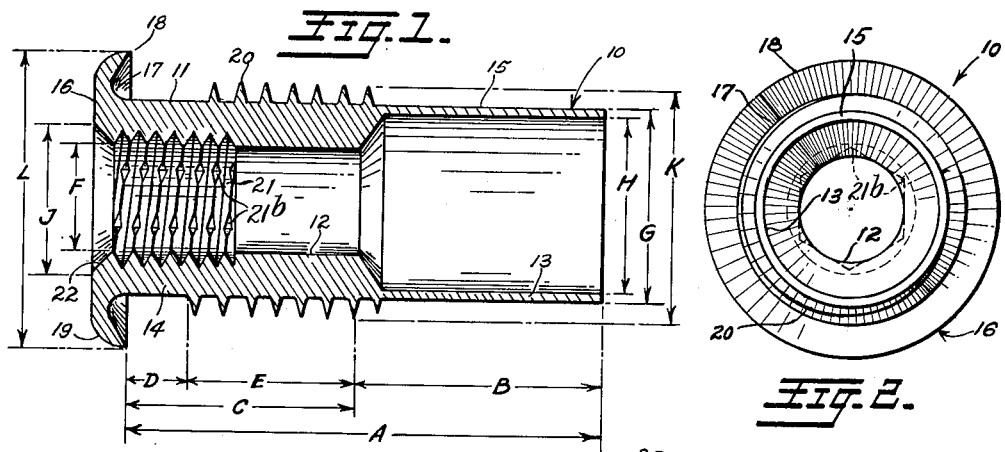
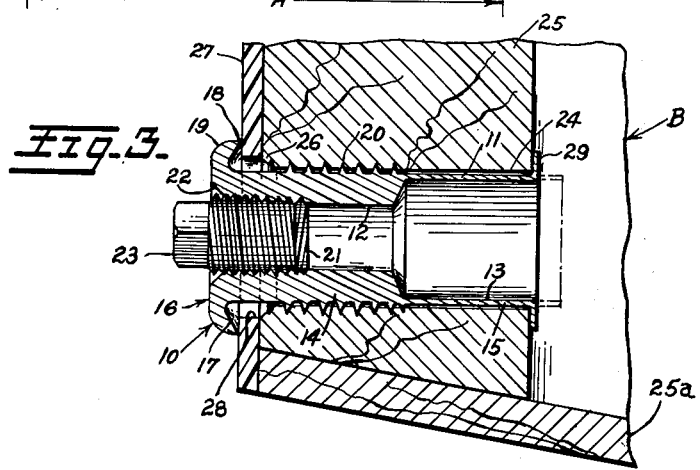
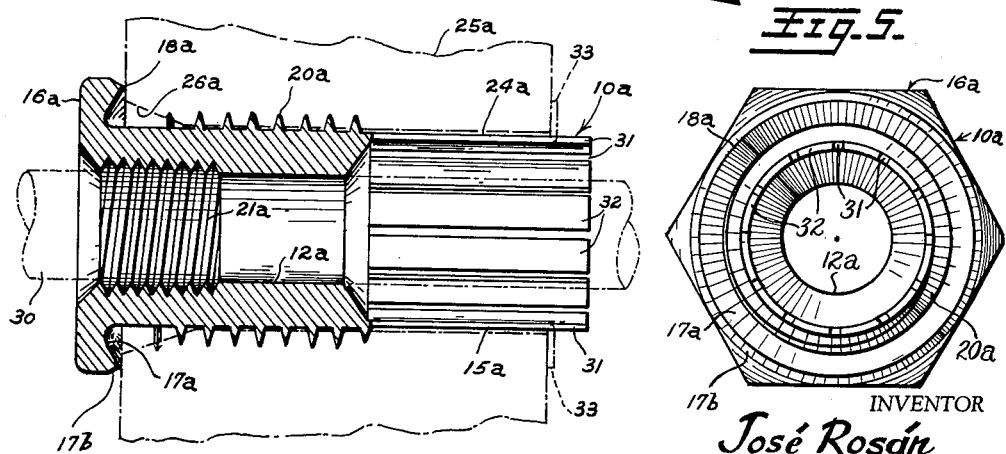
INVENTOR
José Rosán
BY
ATTORNEY

United States Patent Office 3,039,641
Patented June 19, 1962

3,039,641
VALVE-TYPE INSERT
José Rosán, Newport Beach, Calif., assignor to Rosan Engineering Corporation, Newport Beach, Calif., a corporation of California
Filed Nov. 16, 1959, Ser. No. 853,034
1 Claim. (Cl. 217—113)

This invention relates to fasteners and, in particular, to an insert-type fastener useful as a valve or other fitting and adapted to be mounted in a wall opening in various structures, such as the transom of a boat, the wall of a tank, compartment, etc., to serve as a drain valve, or to serve other purposes.

The principal object of the invention is to provide a simple, practical and inexpensive insert of the tubular-type that can be readily mounted in an opening in a wall and permanently locked in place.

Another object is to provide an externally threaded tubular insert adapted to cut its own thread in a wall opening and which has means at its inner end that can be readily deformed or spread outwardly to provide a permanent lock for retaining the insert in place.

Another object is to provide a tubular insert adapted to be mounted in walls of different thicknesses.

Another object is to provide a headed or flanged insert that can be threadedly mounted in a wall opening and which includes means independent of its threads for permanently locking the insert in said opening.

Another object is to provide an insert of the character described which can be provided with internal threads for receiving a plug to serve as a drain valve, or which can be provided with a plain bore for receiving a rod or other element.

A more specific object is to provide a metallic insert having a head at one end thereof, a plurality of threads having a knife-like cutting edge on the exterior thereof adjacent said head, enabling the insert to cut its own thread in an opening in a wall of relatively soft material, and having at its inner end a wall section of greatly reduced thickness that can be readily deformed outwardly to provide a flange cooperable with said head for locking the insert in the opening.

Still another object is to provide an insert of the character described in which the thin-walled section is longitudinally slotted to form a series of fingers that can be bent outwardly to lock the insert in the wall opening.

Other advantages will appear and will be brought out in full in the following description, references being had to the accompanying drawings, wherein:

FIG. 1 is a longitudinal sectional view through one form of insert embodying the present invention;

FIG. 2 is a right end view of the insert shown in FIG. 1;

FIG. 3 is a vertical sectional view through a boat transom showing the insert of FIG. 1 mounted therein and provided with a drain plug;

FIG. 4 is a longitudinal sectional view through a modified form of the invention having a hexagonal head at one end and longitudinal slots at the other end; and FIG. 5 is a right end view of the insert shown in FIG. 4.

Referring to FIGS. 1 to 3 of the drawings, the insert 10 comprises a cylindrical body 11 in the general form of a tube, preferably made of naval brass. The body 11 has a bore 12 extending therethrough that is substantially enlarged at its inner end by a plain counterbore 13. The bore 12 and its counterbore 13 thus provide a thick-walled section 14 at one end of the insert 10 and a relatively thin-walled section 15 at the other end of said insert. A head 16, in the form of a circular flange, is located at the thick end of the insert 10. The head 16 has an undercut 17 that is filleted with the outer surface of the body 11 and flares outwardly to form a thin, axially projecting peripheral edge 18 on the underside of the head. The outer edge of the head 16 is rounded, as indicated at 19.

A thread 20 is formed on the exterior of the thick-walled section 14 and extends from a point spaced from the head 16 to a point approximately at the plane of juncture between the thick and thin-walled sections 14 and 15. The threads 20 are preferably of the knife-edge type, having thin flanks, sharp crests, and a fine pitch enabling the insert 10 to cut its own way into a wall opening, while the insert is being mounted therein. The insert 10 is particularly useful in connection with wooden structures, although it may be used in plastic walls, and walls of similar materials capable of having a thread cut therein by the threads 20. The threads 20 are preferably formed upon the thick-walled section 14 of the insert 10, which has ample strength to resist inward pressures while the insert is being threaded into a wall opening.

The thick-walled section 14 also has an internal thread 21 in the bore 12 at the head-end of the insert. The bore at the entrance end of the thread 21 is chamfered on a 45° angle, as indicated at 22, to facilitate the mounting therein of a taper-threaded plug 23, FIG. 3, or other threaded member, for installing the insert in the bore in the transom 25. If the insert 10 is to serve as a bushing for a rod, shaft, or other member, the thread 21 may be omitted, and a hexagonal head portion, as shown in FIGS. 4 and 5, may be provided to facilitate installation.

The insert 10 may be mounted in any suitable wall structure, and for purposes of illustration, the insert has been shown, in FIG. 3, mounted in an opening 24 in a transom 25 of a boat B having a bottom wall 25a. The outer end of the opening 24 has a tapered counterbore 26 to facilitate entry of the knife threads 20 therein to cut a thread in the wall material defining said opening. The outer side of the transom 25 may be covered with a layer of fiberglass 27. The fiberglass 27 has an opening 28 larger in diameter than the outside diameter of the threads 20. The insert 10 may be threaded into the opening 24 in the transom 25 by inserting the taper-threaded plug 23 into the threaded portion 21 and applying a wrench to the plug until the insert is threaded all the way into the opening and the annular edge 18 on the head 16 is brought into tight contact with the fiberglass 27. The end of the thin-walled section 15 should extend about 1/8" beyond the inner surface of the transom 25 to provide adequate material for forming a retaining flange 29. Thus, the inner end of the insert may be upset or deformed outwardly from the dot-and-dash line position to form the flange 29 shown in full lines. If the thickness of the transom 25 is substantially less than the length of the tubular portion 11, then the excess length beyond the 1/8" may be severed from the insert.

The threads 20 cooperate with the opening 24 to pull the head 16 tightly against the fiberglass 27 to provide a watertight seal at the peripheral edge 18 of the head. As a further precaution, the exterior of the insert 10 may be given a coat of mastic (not shown), which, when set, will not only adhere to the insert and the wall of the opening 24 to lock the insert in place, but will also serve as a seal against leakage of water into the boat. The bending of the inner end of the insert to form the locking flange 29 cooperates with head 16 as well as the threads 20 to permanently lock the insert in place.

If the insert 10 is to be used as a valve, the plug 23 may be left in place until such time as it is desired to remove the same to drain water from the boat.

Threads 21 of the insert 10 of FIGURES 1 and 2 may be formed with a plurality of longitudinal grooves 21b to receive a similarly shaped tool by which the insert may be installed in the opening 24 of the transom.

FIG. 1 is a scaled drawing of one operative form of the invention. As indicated, the length of the tubular portion 11 from the head 16 to the extremity of the thin-walled section 15 is represented by the letter A and may be 2.00". The length of the thin-walled section 15 is indicated by the letter B and may be 1.00". The dimension C represents the length of the thick-walled section 14, exclusive of the head 16, and may also be 1.00". The external threads 20 are spaced from the head 16 a distance D, which may be .250" and extend for a distance E of .750", or to approximately the division point between the thick and thin-walled sections 14 and 15.

The diameter of the bore 12 in the thick-walled section 14 is indicated by the dimension F, which may be .453", or approximately $29/64$". The threads 21 may be any suitable standard thread. For purposes of illustration, the threads 21 may be a 1/4"—18 NPTF thread to receive the plug 23. The chamfer 22 is cut to a depth such that the dimension J is .562". The outside diameter of the insert 10, as indicated by the letter G, is .750". The diameter of the opening 24 is slightly larger, for example, .766". The inside diameter of the counterbore, or thin-walled section 15, is indicated by the letter H and is .688", so that the radial thickness of said thin-walled section is .031", or 1/32". This thickness is about 1/5 of the thickness of the thick-walled section 14 and enables the insert to be readily deformed to provide the locking flange 29.

The outside diameter of the knife-edge thread 20, indicated by the letter K, is .894". Thus, the radial height of the threads 20 is .072", or greater than twice the thickness (.031") of the thin-walled section 15. At the same time, the height of the knife edge threads 20 is less than half of the thickness (.148") of the thick-walled section 14. The threads 20 have a pitch of ten threads per inch.

The thin-walled section 15 may be of any length desired so that the insert can be mounted in walls of different thicknesses. The thick-walled section 14 is preferably of less length than the thickness of the wall in which the insert is to be mounted, so that there will always be a portion of the thin-walled section 15 that can be bent outwardly to form the locking flange 29. Any excess in length of the insert for a given wall thickness can be cut off but, in any event, it is preferable to provide an excess of about .125" of the thin-walled section 15 that can be crimped outwardly to form the retaining flange 29.

Referring now to FIGS. 4 and 5, a modified form of insert 10a is shown in which the flange or head portion 16a is made hexagonal so that a wrench may be applied directly thereto to facilitate the threading of the insert into an opening 24a in a wall 25a. While the bore 12a is shown as having threads 21a, these can be omitted to provide a smooth interior through which a rod or shaft 30 of circular cross section (shown in dot-and-dash lines) may extend. It will be further noted that the thin-walled section 15a has a plurality of longitudinal slots 31 that provide a series of fingers 32 that can be individually bent back to form locking flanges 33 (shown in dot-and-dash lines) to lock the insert in place in the wall 25a. The slots 31 can be made of any length desired, but to provide maximum versatility are made equal in length to the thin-walled section 15a.

The proportions and general dimensions of the insert shown in FIGS. 4 and 5 are substantially the same as that of the insert shown in FIGS. 1 to 3. By way of further specific disclosure, it may be added that the slots 31 have a width of about 1/32" and are preferably at least twelve in number. The head 16a is undercut at 17a and beveled at 17b to form an annular, axially projecting ridge 18a for sealingly engaging the wall 25a as the insert 10a is drawn into the opening 24a by the knife-edge threads 20a. Threading of the insert 10a in the opening 24a can be readily effected by applying a wrench to the hexagonal head 16a. A beveled countersunk portion 26a at the outer end of the opening 24a facilitates starting the cutting action of the threads 20a. In this connection, the thin-walled section 15a cooperates with the opening 24a to serve as a pilot or guide for properly aligning the insert 10a with said opening. The thin-walled section 15 of the insert 10 serve the same function.

It will be understood that the insert members disclosed herein may be made of any desired size and that the proportions thereof may be varied without departing from the principles of the invention or the scope of the annexed claim.

I claim:

An insert having a cylindrical metallic body with a relatively thick wall, having a head portion at one end thereof, and a bore extending longitudinally therethrough, said bore being enlarged at the end opposite said head to provide a relatively thin-walled section, said body having external threads in the region thereof between said head and said thin-walled sections adapted to be threaded into a wall member portion defining an opening into which said body may be introduced, said thick-walled section having internal threads to receive a threaded member, said internal threads having a number of longitudinal serrations cut therein to define a receiving portion for a polygonally-formed member for threadably inserting or removing said insert from a bored receiving member, said external thread being of the knife-edge type adapted to cut its way into the wall material upon rotation of said insert body relative thereto, said head being undercut to provide a sharp peripheral edge, and being chamfered radially.

References Cited in the file of this patent

UNITED STATES PATENTS

| | | |
|---|---|---|
| 2,144,460 | Miller | Jan. 17, 1939 |
| 2,160,598 | Melrath | May 30, 1939 |
| 2,182,954 | Wackman | Dec. 12, 1939 |
| 2,395,063 | Paulus | Feb. 16, 1946 |
| 2,658,434 | Miller | Nov. 10, 1953 |